(12) United States Patent
Bachmann

(10) Patent No.: US 6,752,227 B1
(45) Date of Patent: Jun. 22, 2004

(54) FINAL DRIVE FOR DRIVING A VEHICLE WHEEL

(75) Inventor: Max Bachmann, Bad Waldsee (DE)

(73) Assignee: ZF Friedrichshafen AG, Friedrichshafen (DE)

( * ) Notice: Subject to any disclaimer, the term of this patent is extended or adjusted under 35 U.S.C. 154(b) by 0 days.

(21) Appl. No.: 10/088,313

(22) PCT Filed: Sep. 16, 2000

(86) PCT No.: PCT/EP00/09067

§ 371 (c)(1),
(2), (4) Date: Mar. 14, 2002

(87) PCT Pub. No.: WO01/21427

PCT Pub. Date: Mar. 29, 2001

(30) Foreign Application Priority Data

Sep. 22, 1999 (DE) .......................... 199 45 345

(51) Int. Cl.$^7$ ................................................ B60K 1/00
(52) U.S. Cl. ..................... 180/65.5; 475/149; 74/390
(58) Field of Search ................................ 180/65.5, 220; 475/149, 154, 331, 343, 5; 310/67 A, 67 R; 74/390

(56) References Cited

U.S. PATENT DOCUMENTS

| | | | | |
|---|---|---|---|---|
| 1,743,751 A | * | 1/1930 | Baker .................. | 180/65.5 |
| 2,039,513 A | * | 5/1936 | Baker .................. | 180/65.5 |
| 3,239,701 A | * | 3/1966 | Campbell ............. | 310/112 |
| 3,477,536 A | * | 11/1969 | Carini ................. | 180/65.5 |
| 3,812,928 A | * | 5/1974 | Rockwell et al. ...... | 180/65.5 |
| 3,897,843 A | * | 8/1975 | Hapeman et al. ...... | 180/65.5 |
| 4,330,045 A | * | 5/1982 | Myers ................. | 180/65.5 |
| 4,554,989 A | * | 11/1985 | Gruich et al. ......... | 180/65.5 |
| 4,930,590 A | * | 6/1990 | Love et al. ........... | 180/65.5 X |
| 5,341,892 A | * | 8/1994 | Hirose et al. ......... | 180/220 |
| 5,382,854 A | * | 1/1995 | Kawamoto et al. | |
| 5,633,544 A | * | 5/1997 | Toida et al. .......... | 180/65.5 X |
| 5,894,907 A | * | 4/1999 | Peter .................. | 180/374 |
| 6,139,464 A | * | 10/2000 | Roske ................. | 475/331 |
| 6,321,863 B1 | * | 11/2001 | Vanjani ............... | 180/65.5 |
| 6,328,123 B1 | * | 12/2001 | Niemann et al. ...... | 180/65.5 |
| 6,540,632 B1 | * | 4/2003 | Wendl et al. ......... | 475/5 |

FOREIGN PATENT DOCUMENTS

| | | | |
|---|---|---|---|
| DE | 7121412 | 3/1972 | |
| DE | 39 24 817 A1 | 1/1991 | ........... B60K/1/00 |
| DE | 296 11 867 U1 | 10/1996 | ........... B60K/7/00 |
| DE | 197 09 579 A1 | 9/1998 | ........... B60K/7/00 |
| DE | 197 09 577 A1 | 10/1998 | ........... B60K/7/00 |
| DE | 197 57 232 A1 | 6/1999 | ........... B60K/17/34 |
| EP | 0 919 416 A2 | 6/1999 | ........... B60K/17/04 |
| GB | 2123362 | * 2/1984 | |
| GB | 2201386 | * 9/1988 | |
| GB | 2224984 | * 5/1990 | |
| JP | 3-16828 | * 1/1991 | |
| JP | 5-105178 | * 4/1993 | |
| JP | 6-48192 | * 2/1994 | |

OTHER PUBLICATIONS

U.S. patent Office Publication 2002/0023791—dated Feb. 2002.*

* cited by examiner

*Primary Examiner*—Bryan Fischmann
(74) *Attorney, Agent, or Firm*—Davis & Bujold PLLC

(57) ABSTRACT

A brake (15) is arranged between a drive motor (1) and reduction steps (3, 11). By arranging the reduction steps (3, 11) directly adjacent one another, adequate cooling of one of the reduction steps is achieved. The wheel bearing (13) is located radially outside but axially in the area of the first reduction step (3). By this arrangement, a very compact final drive, is thereby created, in the axial direction, characterized by a favorable efficiency and ease of service.

18 Claims, 2 Drawing Sheets

FINAL DRIVE FOR DRIVING A VEHICLE WHEEL

This application is a national stage completion of PCT/EP00/09067 filed Sep. 16, 2000 which claims priority from German Application Serial No. 199 45 345.4 filed Sep. 22, 1999.

FIELD OF THE INVENTION

The invention relates to a final drive of a vehicle wheel.

BACKGROUND OF THE INVENTION

Final drives for driving a vehicle wheel are mainly used in low-platform buses where each driven wheel of the vehicle has its own drive motor. To obtain a sufficient rear width it is needed to keep as low as possible the axial expansion of the final drive.

DE 197 09 579 A1 has disclosed an electric single final drive having several motors in which the several motors are not disposed coaxially to the wheel axle. Via a first reduction gear drive and a second reduction gear, the output of the motors acts upon the drive wheel. A wheel bearing is situated between the first reduction step and the second reduction step, the same as a brake disk which is additionally located within the extension of the wheel rim of a twin-tire drive wheel. With the wheel bearing being disposed between and separating both reduction gears there occurs, due to the displacement action of the reduction gear chiefly in helical-cut toothed wheels, a shift of the oil level. This disadvantageously affects the lubrication of a reduction step. In order to more compactly design the final drive in its axial extension and make it possible to deliver the required torque, several electrical drive motors have to be used.

The problem on which this invention is based is to provide a final drive for driving a vehicle wheel. The final drive is compactly designed along the axis of the final drive and the brake is situated in a wheel rim, only one drive motor is used for each final drive, the reduction gear is sufficiently lubricated and that stands out by a good degree of efficiency.

SUMMARY OF THE INVENTION

According to the invention the final drive can be decelerated via a brake located within the axial extension of a wheel rim. It is possible that the wheel rim accommodates a single tire and the brake is placed between the drive motor and the reduction steps. With the reduction steps being disposed directly adjacent, all the moving parts of the toothing can be lubricated by lubricant which is located within a space common with the reduction steps. By virtue of the arrangement of the reduction gear upon the outer side of the wheel, heat can satisfactorily radiate to the environment, resulting in a uniform temperature level. Since the drive motor is not situated coaxially with the rotational axis of the wheel, an installation space between the wheel rim and drive motor results and the brake and the actuation mechanism can be placed therein. The wheel bearing is preferably disposed for absorbing the wheel forces radially above the first reduction gear so that the axial installation space needed by the wheel bearing is available for the drive motor. Thereby the drive motor can be designed with a maximum active length preferably similar or equal to the diameter of the air gap without the total length of the final drive being enlarged thus increasing the degree of efficiency of the drive motor. By the wheel bearing being situated in a radial direction outside the first reduction step but being located in the radial extension area of the first reduction step, it is possible to connect the wheel hub, one part of the second reduction step and the bearing flange with the wheel bearing to form a compact unit. This compact unit does not need to be separated even when disassembling the wheel drive such that during assembly after servicing, the wheel bearing does not need to be readjusted. The second reduction step is preferably designed as a planetary gear wherein the planet carrier of the planetary gear forms the output, the ring gear is connected with the hub carrier which carries the wheel bearing and the inner central wheel forms the input. It is also possible to design the ring gear as an output. In this case the inner central wheel is driven by the first reduction step which is preferably designed so that the ring gear forms the output and an input pinion forms the input, which is in intermeshing connection with the ring gear and at least two intermediate wheels, and the carrier which holds the intermediate wheel is non-rotatably retained. By the input pinion being in intermeshing connection directly with the ring gear, the drive motor which drives the input pinion can be situated at a maximum distance from the wheel axle with the result of a sufficient installation space for the brake and the actuation mechanism of the brake. With the input pinion having an intermeshing connection with the ring gear and with at least two intermediate wheels, torque is distributed from the input pinion at multiple locations with the consequence of an increase in the service life of the input pinion and the first reduction step can be more compactly designed by reducing the diameter of the wheel bearing. With the housing of the drive motor transmitting the wheel forces and the mounting pad of the drive motor being located in the area of the load active line on a hub carrier, the hub carrier carries the wheel bearing where the wheel forces are introduced. The connecting elements of the supporting parts which absorb the wheel forces can be designed more compactly, since no additional torque load from a distance to the load active line acts upon the mounting pad and the connecting elements thereof. Hereby the radial extension of the mounting pad of the drive motor housing can be compactly designed on the bearing flange such that a sealing element can be placed between the bearing flange, situated to be non-rotatable and a wheel hub rotating at wheel rotational speed which has less peripheral velocities to overcome due to the small radial extension. The housing of the drive motor can either be fixed to an axle bridge or have supporting places on which fastening elements can be situated for fastening the final drive to the vehicle body. Since the drive motor is located on the inner side of the wheel, the energy can be favorably supplied. Fins are preferably situated upon the wheel hub such that upon rotation of the wheel hub the medium surrounding the wheel hub is circulated so that the brake and the final drive are cooled. A coolant preferably flows through the housing of the drive motor thus cooling the drive motor and the remaining final drive is also cooled via the mounting pad of the drive motor.

A directly adjacent arrangement of the reduction steps and a brake situated between the reduction steps and the drive motor but within the axial and radial extension of a wheel rim create a final drive for driving a vehicle wheel which stands out by a compact construction, where a drive motor with an optimum degree of efficiency can be used and the reduction steps are sufficiently lubricated.

BRIEF DESCRIPTION OF THE DRAWINGS

The invention will now be described, by way of example, with reference to the accompanying drawings in which.

DETAILED DESCRIPTION OF THE INVENTION

Figure 1:
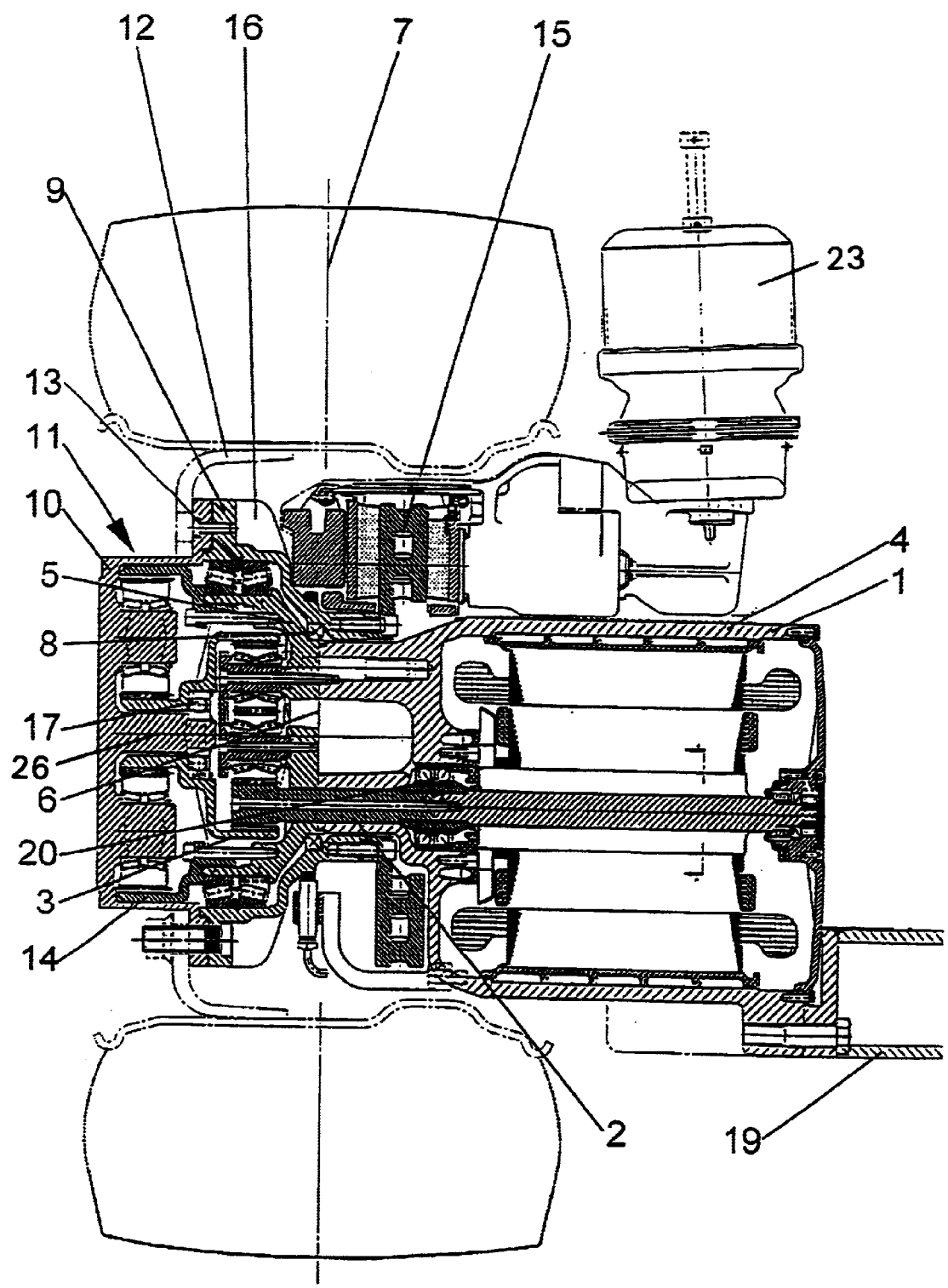
FIG. 1 is a final drive for driving a vehicle with a double-shear planet carrier.

The drive motor 1, not coaxially situated relative to the rotational axis of the wheel 26, is preferably an electric drive motor but may also be a hydraulic or pneumatic drive motor and it drives an input shaft 2 which preferably passes into the housing 4 of the drive motor 1 of a first reduction step 3. The housing 4 of the drive motor is preferably cooled by water and is connected with a hub carrier 5 via connecting elements. The hub carrier 5 is located in the area of a load active line 7 along the mounting pad 6 of the drive motor 1 where the wheel forces act upon the final drive. The longitudinal center of the tire and wheel define the active load line 7. The mounting pad 6 being situated in the area of the active load line 7 so that none or only small torque loads, generated by the vehicle weight, act upon the elements which connect the hub carrier 5 with the housing 4 of the drive motor 1. The mounting pad 6 can thus have a small dimension along its radial extension, it being possible upon this diameter to place a sealing element 8 between a wheel hub 9 rotating at the rotational speed of the wheel and the hub carrier 5. Since the dimension of the radial extension of the mounting pad 6 is small, the peripheral velocity of the sealing element 8 is also small, which advantageously acts upon the service life of the sealing element 8. The wheel hub 9 is connected with the planet carrier 10 which forms the output of a second reduction gear 11 and with a wheel rim 12. A pair of wheel bearings 13 support the wheel hub 9, the ring gear 14, the second reduction step 11, the sealing element 8 and the hub carrier 5 to form a unit which is adjusted only once at the plant and remains complete when the final drive is disassembled for servicing. A brake disk 15 is placed over connecting elements on the wheel hub 9 by which the wheel hub 9 can be decelerated. The brake disk 15, which is preferably assembled as a pair of discs fixed together, but can also be assembled as a complete brake disk, in its axial installation position is set apart from the sealing element 8 such that a detrimental increase in temperature of the brake disk 15 does not afflict the sealing element 8. Fins 16 are preferably situated on the wheel hub 9, such that upon rotation of the wheel hub 9 the medium surrounding the wheel hub 9 is circulated so that the brake disk 15 and the complete final drive are cooled. A bearing 17 supports the inner central wheel 18 of the second reduction step 11 upon the planet carrier 10 rotates only at the differential rotational speed between the inner central wheel 18 and the planet carrier 10 whereby the service life of the bearing is increased. The bearing 17 can also be constructed as an axial thrust plate. If the first reduction step 3 and the second reduction step 11 have a helical-cut design, it is possible to design the teeth of the gears so that the bearing 17 is free of forces. The housing 4 of the drive motor 1 is preferably fixed to an axle bridge 19 but can also be designed having fastening elements for a single-wheel suspension. The first reduction step 3 and the second reduction step 11 are disposed directly adjacent each other thus being surrounded by a common lubricant whereby the lubrication lubricates both reduction steps. The wheel bearings 13 are situated radially further outside the first reduction step 3 and axially in the area of the first reduction step 3. This design creates a very compact final drive. With the wheel bearing 13 being placed radially further outside the first reduction step 3 and tapered roller bearings being preferably used, the drive wheel is supported in a more stable manner. The input shaft 2 preferably has a recess 24 on its exterior surface which delivers lubricant so that the motor bearing 20 remains lubricated. It is also possible to eccentrically design the opening in which the input shaft 2 is situated in order to make available sufficient lubrication to the motor bearing 20. The reduction gears 3 and 11 have teeth that are preferably helically-cut in order to achieve a favorable noise level. The planets 21 of the second reduction gear 11 are floatingly supported whereby the axial length of the final drive is further reduced.

Figure 2:
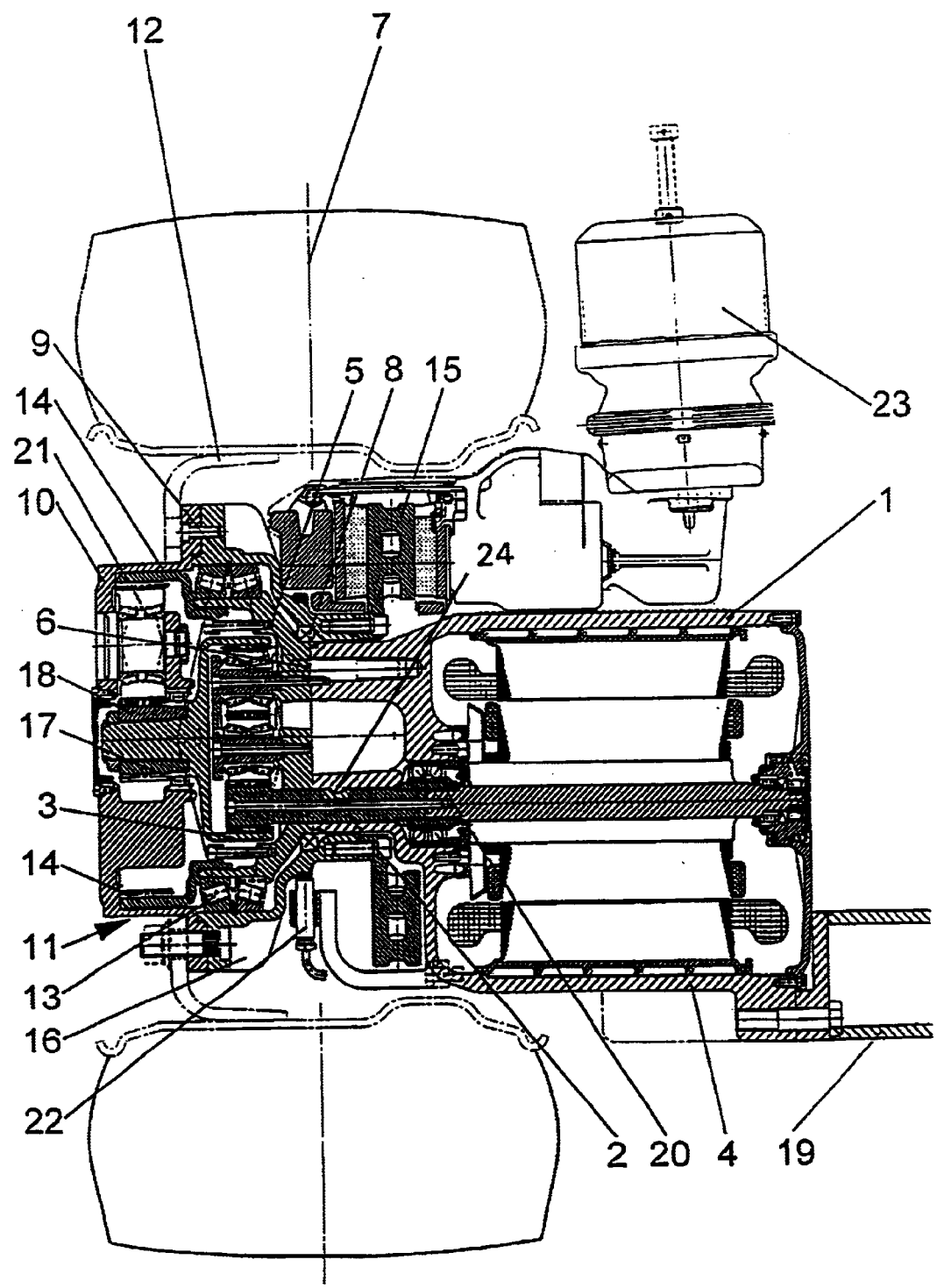
FIG. 2 is a second bearing arrangement for the final drive for driving a vehicle with a double-shear planet carrier.

A second embodiment of the invention will now be described with respect to FIG. 2. The embodiment of FIG. 2 differs from the embodiment of FIG. 1 in at least the arrangement of the bearing 17 located between the first and second reduction gears. In the embodiment of FIG. 2, the bearing 17 is located on the 4 outside of the inner central wheel 18, not on the inside as with FIG. 1. A drive motor 1 drives a first reduction step 3, the output of which drives a second reduction step 11 preferably designed as planetary transmission with planet gears 21. The ring gear of the second reduction step 11 can be connected, in a radial direction, with the hub carrier 5 either via a screw connection or via safety rings or pins. A rotational speed sensor 22 is placed between the brake disk 15 and the first reduction gear 3. The brake is actuated with an actuation mechanism 23 which is preferably situated on the side. It is also possible to actuate the brake via rods extending outside the inner wheel area. The input shaft 2 of the first reduction step 3 has a winding recess, that extends along the axial length of the first reduction step 2, which upon rotation to the input shaft 2 delivers lubrication between the first reductions step 3 and the drive motor 1.

Reference numerals 1 drive motor
2 input shaft
3 first reduction step
4 housing
5 hub carrier
6 mounting pad
7 load active line
8 sealing element
9 wheel hub
10 planet carrier
11 second reduction step
12 wheel rim
13 wheel bearing
14 ring gear
15 brake disk
16 fins
17 bearing
18 inner central wheel
19 axle bridge
20 motor bearing
21 planet gears
22 rotational speed sensor
23 actuation mechanism
24 winding recess
26 wheel

What is claimed is:

1. A final drive for propelling a vehicle wheel, the drive comprising:

a vehicle wheel with a rim (12) defining a wheel rotational axis;

a drive motor (1) having a rotational drive axis offset with respect to the wheel rotational axis, and the drive motor (1) driving the vehicle wheel via reduction gears (3, 11); and a disk brake (15) situated within the rim (12) for braking rotation of the vehicle wheel, and the disk brake (15) being actuated by an actuation mechanism (23);

wherein the reduction gears (3, 11) comprise first and second reduction gear sets (3, 11) which are located adjacent one another, and the disk brake (15) is located between the drive motor (1) and the first and second reduction gears (3, 11).

2. The final drive according to claim 1, wherein the actuation mechanism (23) is located adjacent the drive motor (1).

3. The final drive according to claim 1, wherein a wheel bearing (13) radially circumscribes the first reduction gear (3) for facilitating rotation of the vehicle wheel.

4. The final drive according to claim 1, wherein the second reduction gear set (11) is a planetary gear set having a sun gear, a ring gear and a plurality of planet gears.

5. The final drive according to claim 1, wherein a mounting pad (6) for the drive motor (1) is located along an active load line (7) and separates the first and second reduction gear sets (3, 11) from the drive motor (1).

6. The final drive according to claim 1, wherein the drive motor (1) includes a housing (4) and radial forces act upon housing (4).

7. The final drive according to claim 1, wherein the drive motor (1) is an electromotor.

8. The final drive according to claim 7, wherein a fixed ring gear (14) of the second reduction gear set (11) is carried by a hub carrier (5) which is also radially circumscribed by the wheel bearings (13).

9. The final drive according to claim 1, wherein a seal (8) is situated between a hub carrier (5) and a wheel hub (9) integral with the disk brake (15).

10. The final drive according to claim 1, further comprising a wheel hub (9) having exterior fins (16) which, upon rotation of the wheel hub (9), induces flow of a cooling medium which is directed toward at least the disc brake (15) to facilitate cooling thereof.

11. The final drive according to claim 1, wherein the drive motor (1) is hydraulically cooled.

12. The final drive according to claim 1, wherein a ring gear (14) of the second reduction gear (11), a rotatably fixed hub carrier (5), a wheel bearing (13) and a seal (18) are all combined with one another to form a single assembly unit.

13. The final drive according to claim 1, wherein an input shaft (2) of the first reduction gear (3) has a recess which supplies lubricant to a motor bearing (20) upon rotation of the input shaft (2).

14. The final drive according to claim 1, wherein an input pinion of the first reduction gear (3) meshes with a ring gear of the first reduction gear (3) and an intermediate wheel of the first reduction gear (3) which meshes with at least one other intermediate wheel.

15. The final drive according to claim 1, wherein a wheel bearing (13) has an axis skewed from the longitudinal axis of the wheel and motor axis.

16. The final drive according to claim 1, wherein a wheel bearing (13) comprises a pair of adjacent tapered bearings.

17. A final drive for propelling a vehicle wheel, the drive comprising:

a drive motor (1) having at shaft extending along a drive axis, the shaft driving first and second reduction gear set (3, 11);

a wheel driven by the first and second gears set (3, 11) rotates about a wheel axis, and the drive axis is offset with respect to the wheel axis; and a disk brake (15) is actuated by an actuation mechanism for braking the wheel, and the disk brake being located within a rim (12) of the wheel;

the first and second reduction gears sets (3, 11) are located adjacent each other and the disk brake (15) is placed between the drive motor (1) and the first and second reduction gears (3, 11).

18. A final drive for propelling a vehicle wheel, the drive comprising:

a vehicle wheel with a rim (12) defining a wheel rotational axis;

a drive motor (1) having a rotational drive axis offset with respect to the wheel rotational axis, and the drive motor (1) driving the vehicle wheel via reduction gears (3, 11);

a disk brake (15) located within the rim (12) for braking rotation of the vehicle wheel, the disk brake (15) defining a brake plane extending normal to the wheel rotational axis, and the disk brake (15) being actuated by an actuation mechanism (23);

wherein the reduction gears (3, 11) comprises first and second reduction gear sets (3, 11), and the drive motor (1) is located on one side of the brake plane while the first and second reduction gear sets (3, 11) are located on an opposite side of the brake plane.

* * * * *